United States Patent [19]

Van Landingham

[11] Patent Number: 4,865,482
[45] Date of Patent: Sep. 12, 1989

[54] PET FLEA AND TICK BRUSH

[76] Inventor: Catherine G. Van Landingham, 5 Seminole Dr., Lake City, Fla. 32055

[21] Appl. No.: 712,144

[22] Filed: Mar. 15, 1985

[51] Int. Cl.$^4$ ............................................. A46B 11/02
[52] U.S. Cl. .................................... 401/287; 119/156; 401/183; 401/288
[58] Field of Search ............... 401/286, 287, 288, 183, 401/186, 28; 119/156; 132/112, 113, 114

[56] References Cited

U.S. PATENT DOCUMENTS

| | | | |
|---|---|---|---|
| 2,827,650 | 3/1958 | Morrill et al. | 401/186 |
| 2,922,178 | 1/1960 | Kelly | 401/288 X |
| 2,922,425 | 1/1960 | Lerner et al. | 401/287 X |
| 3,056,999 | 10/1962 | Myddelton | 401/183 |
| 3,224,030 | 12/1965 | Maichen | 401/183 X |
| 4,237,822 | 12/1980 | Kaiser, Jr. | 401/28 X |

FOREIGN PATENT DOCUMENTS

| | | | |
|---|---|---|---|
| 496181 | 1/1928 | Fed. Rep. of Germany | 401/28 |
| 1243684 | 9/1960 | France | 401/183 |
| 1252647 | 12/1960 | France | 132/114 |
| 1324774 | 3/1963 | France | 401/183 |
| 888091 | 1/1962 | United Kingdom | 401/183 |

Primary Examiner—Steven A. Bratlie
Attorney, Agent, or Firm—John W. Carpenter

[57] ABSTRACT

A pet flea and tick brush comprising a container with deforming walls. The container includes a threaded hollow container neck in communication with the inside of the container. A hollow brush neck threadably engages the container neck. The hollow brush neck includes an essentially central axis that defines approximately between about 50° and about 70° angle with a horizontal plane. A brush head having a generally oval elliptical shaped face is integrally bound to the brush neck. The oval elliptical shaped face includes a facial plane that makes approximately between about 50° and about 70° angle with the central axis of the hollow neck brush. A plurality of generally frusto-conical hollow teeth with a discharge aperture is integrally bound to the oval elliptical shaped face. The ingredients from within the container pass from the container through the discharge aperture of the hollow teeth when the container is squeezed and/or inverted. A plurality of bristle members is attached to the oval elliptical shaped face and extends outwardly therefrom at a distance beyond the length of the teeth such as to generally encompass and hide all of the hollow teeth from the eye of the user and the pet.

3 Claims, 1 Drawing Sheet

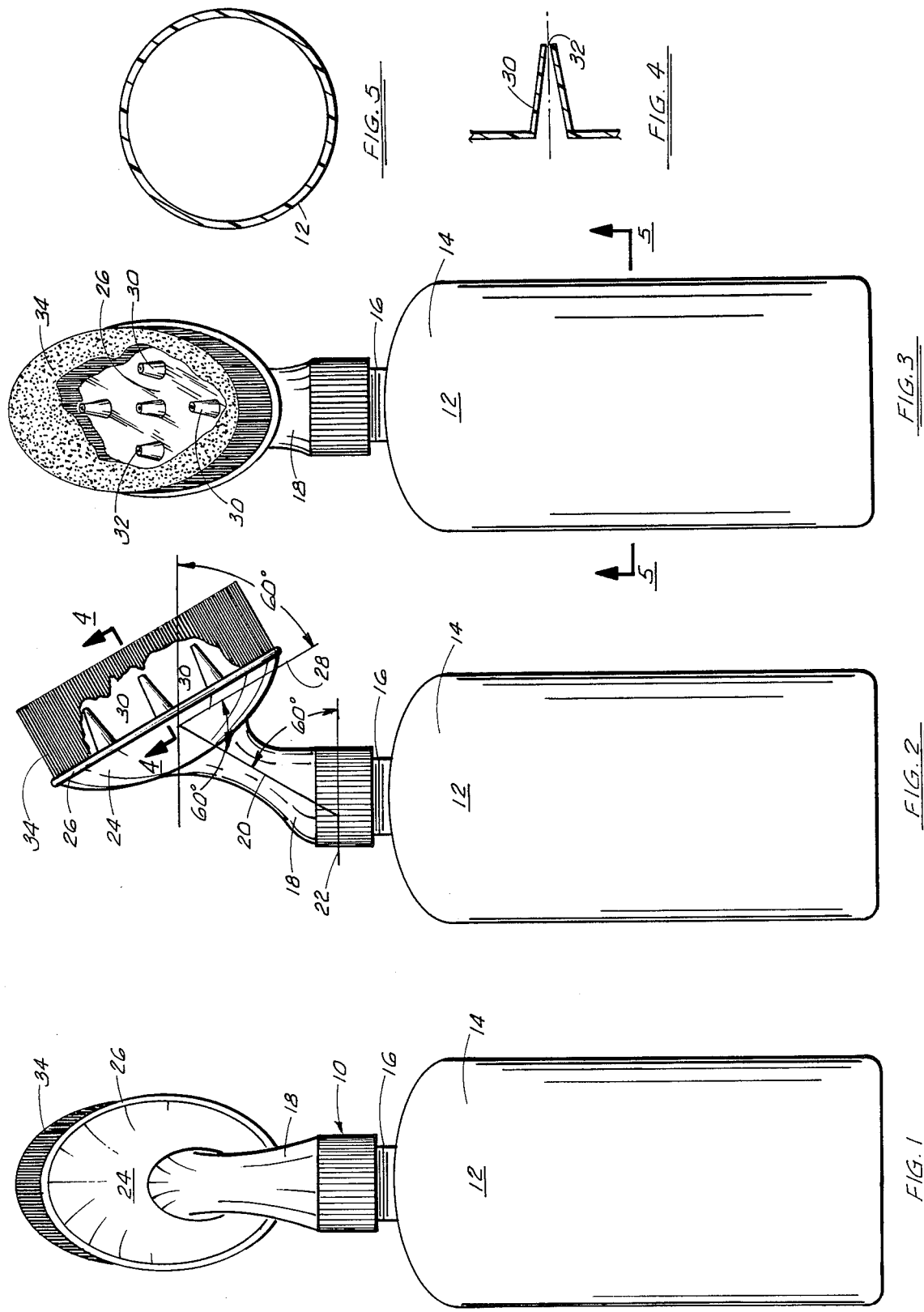

PET FLEA AND TICK BRUSH

BACKGROUND OF THE INVENTION

1. Field of the Invention

This invention relates to a pet flea and tick brush. More specifically, this invention provides a pet flea and tick brush that will allow the application of a flea and/or tick control product to animals while brushing and grooming the animal.

2. Description of the Prior Art

U.S. Pat. No. 1,610,595 by Rudolph discloses a fluid feeding brush housing bristles that may be fed with a fluid by the operator. U.S. Pat. No. 2,922,425 by Lerner, et al teaches an applicator for applying a treating liquid to hair, more specifically to an applicator for use in applying lotions to hair while it is wound upon a curler. U.S. Pat. No. 3,119,142 describes a fountain brush with a handle adapted to contain a liquid such as water, hair tonic, or the like, and which is adapted to be dispensed during the hair brushing operation. U.S. Pat. No. 3,973,853 by Myers relates generally to applicators for spraying the contents of aerosol cans between hair brush bristles or comb teeth. U.S. Pat. No. 4,155,663 by Cerquozzi discloses a dentifrice dispensing toothbrush. U.S. Pat. No. 4,277,193 by Knaus teaches a combination brush and comb. None of the foregoing art either taken singularly or in combination teach or suggest the particular pet flea and tick brush of this invention.

SUMMARY OF THE INVENTION

It is therefore an object of this invention to provide a pet flea and tick brush.

It is another object of this invention to provide a pet care device that will allow the application of a flea and/or tick control product to animals while brushing and grooming the animals.

It is yet a further object of this invention to provide a flea and tick brush which controls fleas and ticks on pets without frightening the pet during application.

Still further objects of the invention will become apparent to those possessing ordinary skill in the art.

The foregoing objects of this invention are achieved by a pet flea and tick brush having a container means with deforming walls and a threaded hollow container neck in communication with the inside of the container means. A hollow brush neck means threadably engages the container neck and includes an essentially central axis that defines an approximately between 50° and about 70° angle with a horizontal plane. A brush head means having a generally oval elliptical shaped face is integrally bound to the brush neck means. The oval elliptical shaped face includes facial plane that makes approximately between about 50° and about 70° angle with the central axis of the hollow neck brush means. A plurality of generally frusto-conical hollow teeth with a discharge aperture is integrally bound to the oval elliptical shaped face. Ingredients from the container means pass through the discharge aperture of the hollow teeth when the container means is squeezed and/or inverted. A plurality of bristle members attach to the oval elliptical shaped face and extend outwardly therefrom at a distance beyond the length of the teeth such as to generally encompass and hide all of the hollow teeth from the eye of the user and the pet.

BRIEF DESCRIPTION OF THE DRAWINGS

FIG. 1 is a back elevational view of the pet flea and tick brush;

FIG. 2 is a side elevational view of the pet flea and tick brush;

FIG. 3 is a front elevational view of the pet flea and tick brush;

FIG. 4 is an exploded vertical sectional view of a hollow tooth taken in direction of the arrows and along the plane of line 4—4 in FIG. 2; and FIG. 5 is a horizontal sectional view of the container taken in direction of the arrow and along the plane of line 5—5 in FIG. 3.

DETAILED DESCRIPTION OF THE INVENTION

Referring in detail now to the drawings wherein similar parts of the invention are identified by like reference numerals, there is seen the pet flea and tick brush of this invention, generally illustrated as 10. Brush 10 comprises a container 12 which includes deforming or compressible, resilient walls 14 that constructed or manufactured of a material (e.g. polyethylene, polypropylene, or any resilient plastic, or the like) that can be compressed for dispersion purposes and after compression, return to its original shape which is preferably generally cylindrical, as illustrated in the drawings. Container 12 includes a powder or liquid ingredients for controlling and/or killing fleas and/or ticks, well known to those in the art.

Container 12 has a threaded hollow container neck 16 which is in communication with the inside of the container 12. A hollow brush neck 18 is threadably engaged to the container neck 16 and includes an essentially central axis 20 (see FIG. 2) that defines an approximately between about 50° and about 70° angle with a horizontal plane 22. In a preferred embodiment of the invention, the central axis 20 is at approximately 60° with the horizontal plane 22.

A brush head 24 has a generally oval elliptical shaped face 26 which is integrally bound to the brush neck 18. The oval elliptical shaped face 26 includes a facial plane 28 (see FIG. 2) that makes approximately between 50° and about 70° angle with the central axis 20 of the hollow neck brush 18. In a preferred embodiment of the invention the facial plane 28 makes about a 60° angle with the central axis 20 of the hollow neck brush 18.

A plurality of generally frusto-conical hollow teeth 30 with a discharge aperture 32 (see FIG. 4) is integrally bound to the oval elliptical shaped face 26. The ingredients from within the container 12 pass from the container 12 through the container neck 16 and the brush neck 18 to be dispensed through the discharge aperture 32 of the teeth 30 when the container 12 is squeezed and/or inverted.

A plurality of bristle members 34 attach to the oval elliptical shaped face 26 and extend outwardly therefrom at a distance beyond the length of the teeth 30 such as to generally encompass and hide all of the teeth 30 from the eye of the user and the pet.

In order to facilitate the application of the ingredients contained within the container 12 on a pet, the angular disposition of the brush neck 18, including its central axis 20 with respect to the horizontal plane 22, in combination with the angular disposition of the facial plane 28 of the oval elliptical face 26 with respect to the central axis 20 of the brush neck 18 is of utmost importance. I have found that by disposing the oval elliptical face 26 at between about 50° and 70° (preferably 60°) with respect to the central axis 20 of the brush neck 18, which neck 18 has to be disposed at between about 50° and 70° (preferably 60°) with respect to the horizontal plane 22, application of the ingredients within the container 12 on the body of pet is facilitated since the user's hand is in a more of a natural position (especially considering that the container 12 has to be squeezed and/or inverted) than when the face 26 occupies any other angular disposition with respect to the central axis 20 of the brush neck 18. As previously mentioned, neck 18 has to preferably be approximately 60° with the horizontal plane 22 in order also to maintain the hand and/or wrist of a user in a comfortable natural position.

In further order to facilitate application of the ingredients within the container 12 upon the pet, the face 26 should be oval elliptical in shape. I have found that a face 26 which possesses corners, such as a rectangular or square face, application of the ingredients within the container 12 are hendered when the face 26 is stroked over the body of the pet. Any corners or rough edges on the face 26 become entangled within and among the hairs of the pet. This causes the hairs, especially with those cats and dogs possessing long hairs which have a tendency to become knotted (e.g. cocker spaniel), to be pulled or even removed from the body of the animal. Pain results in the pet. Therefore, the face 26 of this invention should be oval and elliptical in shape.

I have also discovered that the bristle brush members 34 should be longer than the hollow teeth 30 in order to prevent from frightening the pet. Most pets do not object to a gentle brushing and grooming, and the flea and tick control ingredient within the container 12 can be applied during this brushing without upsetting or frightening the pet. Generally, I have discovered that other methods of applications, such as spray bottles, aerosols, powdering from a can wherein part of the powder becomes airborne through diffusion, etc., frighten the pet and makes it very difficult to control the pet during application. I have discovered that my pet flea and tick brush 10 allows the application of a flea and tick control product from within the container 12 onto animals (cats, dogs, etc) while brushing and grooming the animal. This results in a gentle, non-frightening means of accomplishing the application of a flea and tick control product on the pet from within the container 12. The brush bristle members 34 gently separate the hairs of the animal while the squeezing of the container 12 forces the powder or liquid through the aperture 32 of the hollow teeth 30 and deep into the animal's fur where the offending fleas and/or ticks lurk. By the bristle members 34 being longer than the hollow teeth 30 separtion of the hairs of the animal is facilitated and doesn't cause the pulling of the animal's hair and/or abrasion of the animal's skin (from the hollow teeth 30) which would happen if the hollow teeth 30 were the same length as the bristle members 34. The hollow teeth 30 alone without the bristle members 34 would have a worst or identical tendency to pull and/or entangle the hairs of the animal as an edged or rough edged face member 26. I have also discovered that most animals are less frightened when they perceive a mere brush as opposed to perceiving a plurality of the hollow teeth 30 that are not camouflaged by any bristle members 34. Thus, by the practice of my invention, there is provided a pet flea and tick brush 10 that is easily applied by a user, especially those users suffering by arthritis of the hand and/or wrist, and one that does not frighten an animal while brushing and grooming the animal.

While the present invention has been described herein with reference to particular embodiments thereof, a latitude of modification, various changes and substitutions are intended in the foregoing disclosure, and it will be appreciated that in some instances some features of the invention will be employed without corresponding use of other features without departing from the scope of the invention as set forth.

I claim:

1. A pet flea and tick brush comprising a container means with deforming walls and including a threaded hollow container neck in communication with the inside of said container means; a substantially hollow brush neck means threadably engaged to container neck and including an essentially central axis that defines an approximately between about 50° and about 70° angle with a horizontal plane; a substantially hollow brush head means integrally bound to said hollow brush neck means and having a brush head reservoir for receiving ingredients from said hollow brush neck means and a generally oval elliptical shaped face that forms an entire side of said brush head reservoir, said oval elliptical shaped face including a facial plane that makes approximately between about 50° to about 70° angle with the central axis of said hollow brush neck means; a plurality of generally frusto-conical hollow teeth with each tooth having a discharge aperture in communication with said brush head reservoir and integrally bound to said oval elliptical shaped face wherethrough ingredients from within the container means pass when the container means is squeezed and/or inverted; and a plurality of bristle members attached to said oval elliptical shaped face and extending outwardly therefrom at a distance beyond the length of the teeth such as to generally encompass and hide all of said hollow teeth from the eye of the user.

2. The brush of claim 1 wherein said central axis of said brush neck means defines an approximately 60° angle with a horizontal plane.

3. The brush of claim 2 wherein said facial plane of said oval elliptical shaped face makes approximately a 60° angle with the central axis of said hollow brush neck means.

* * * * *